(12) United States Patent
Sackett et al.

(10) Patent No.: US 9,734,375 B2
(45) Date of Patent: Aug. 15, 2017

(54) METHOD OF CONTROLLING EXPOSURE ON BARCODE IMAGING SCANNER WITH ROLLING SHUTTER SENSOR

(71) Applicant: SYMBOL TECHNOLOGIES, INC., Schaumburg, IL (US)

(72) Inventors: William C Sackett, East Setauket, NY (US); Daniel F Brown, E Northport, NY (US); James R Giebel, Centerport, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 441 days.

(21) Appl. No.: 13/975,530

(22) Filed: Aug. 26, 2013

(65) Prior Publication Data

US 2015/0053767 A1    Feb. 26, 2015

(51) Int. Cl.
*G06K 19/00* (2006.01)
*G06K 7/14* (2006.01)
*G06K 7/10* (2006.01)

(52) U.S. Cl.
CPC ....... *G06K 7/1465* (2013.01); *G06K 7/10722* (2013.01); *G06K 7/10732* (2013.01)

(58) Field of Classification Search
USPC ................................ 235/435, 439, 454, 462
See application file for complete search history.

(56) References Cited

U.S. PATENT DOCUMENTS

| | | | |
|---|---|---|---|
| 7,646,422 B2 | 1/2010 | Kisacanin et al. | |
| 8,237,835 B1 | 8/2012 | Muller | |
| 8,336,778 B2 | 12/2012 | Powell et al. | |
| 8,408,464 B2 | 4/2013 | Zhu et al. | |
| 8,448,862 B2 | 5/2013 | Powell et al. | |
| 2004/0228508 A1 | 11/2004 | Shigeta | |
| 2006/0138236 A1* | 6/2006 | Hepworth et al. | ............ 235/454 |
| 2006/0202038 A1 | 9/2006 | Wang et al. | |
| 2007/0284447 A1 | 12/2007 | McQueen | |
| 2010/0165160 A1 | 7/2010 | Olmstead et al. | |

(Continued)

FOREIGN PATENT DOCUMENTS

| | | |
|---|---|---|
| EP | 2485177 A2 | 8/2012 |
| WO | 9613799 A2 | 5/1996 |

OTHER PUBLICATIONS

Office Action for Korean Patent Application No. 10-2016-7007732 mailed on Dec. 20, 2016.

(Continued)

*Primary Examiner* — Matthew Mikels
(74) *Attorney, Agent, or Firm* — Yuri Astvatsaturov

(57) ABSTRACT

A method includes the following (1) detecting light returned from a target with an imaging sensor during a first frame exposure time period to capture a first image when a first illumination light is projected towards the target; (2) processing the first image to determine the light intensity of a second illumination light; (3) detecting light returned from the target with the imaging sensor during a second frame exposure time period to capture a second image when the second illumination light is projected towards the target; and (4) decoding a barcode in the second image. The light intensity of the first illumination light changes with time at least during part of the first frame exposure time period.

20 Claims, 7 Drawing Sheets

(56) References Cited

U.S. PATENT DOCUMENTS

2012/0307221 A1 12/2012 Spears
2013/0082109 A1 4/2013 Meier et al.

OTHER PUBLICATIONS

International Search Report and Written Opinion for PCT/US2014/049711 mailed on Nov. 10, 2014.
International Preliminary Report on Patentability for PCT/US2014/049711 mailed on Mar. 1, 2016.

\* cited by examiner

METHOD OF CONTROLLING EXPOSURE ON BARCODE IMAGING SCANNER WITH ROLLING SHUTTER SENSOR

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having different light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. A imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
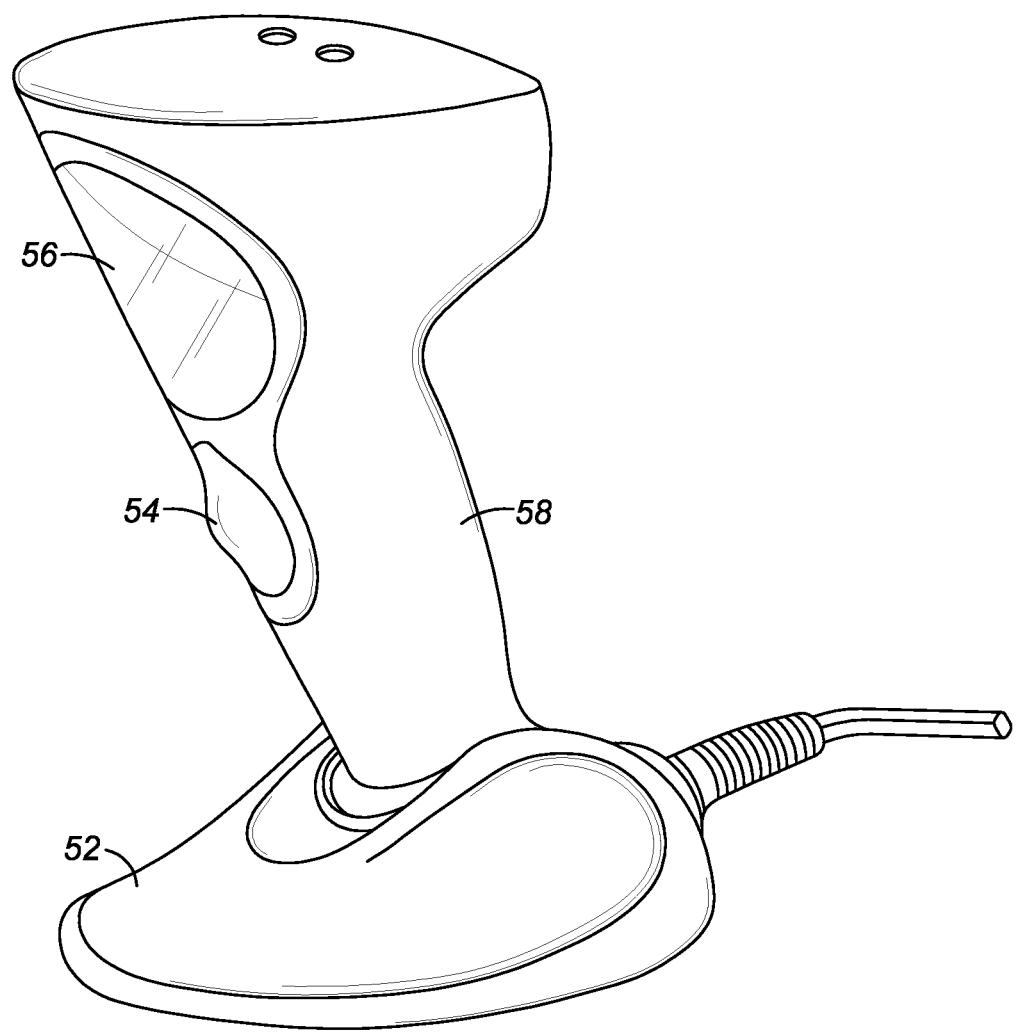
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method includes the following processes: (1) detecting light returned from a target object through an imaging lens arrangement with an imaging sensor during a first frame exposure time period to capture a first image when a first illumination light is projected towards the target object; (2) processing the first image to determine the light intensity of a second illumination light; (3) detecting light returned from the target object through the imaging lens arrangement with the imaging sensor during a second frame exposure time period to capture a second image when the second illumination light is projected towards the target object; and (4) processing an image of a barcode in the second image to decode the barcode. The imaging sensor has rows of photosensitive elements arranged in a matrix wherein each row of photosensitive elements is associated with a corresponding row-exposure-time period. The light intensity of the first illumination light changes with time at least during part of the first frame exposure time period. The average light intensity of the first illumination light during a first row-exposure-time periods associated with a first selected row is different from the average light intensity of the first illumination light during a second row-exposure-time period associated with a second selected row. During the process of processing the first image comprises, a first part of the first image is compared with a second part of the first image. The first part of the first image includes pixels captured with photosensitive elements at least in the first selected row, and the second part of the first image includes pixels captured with photosensitive elements at least in the second selected row.

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
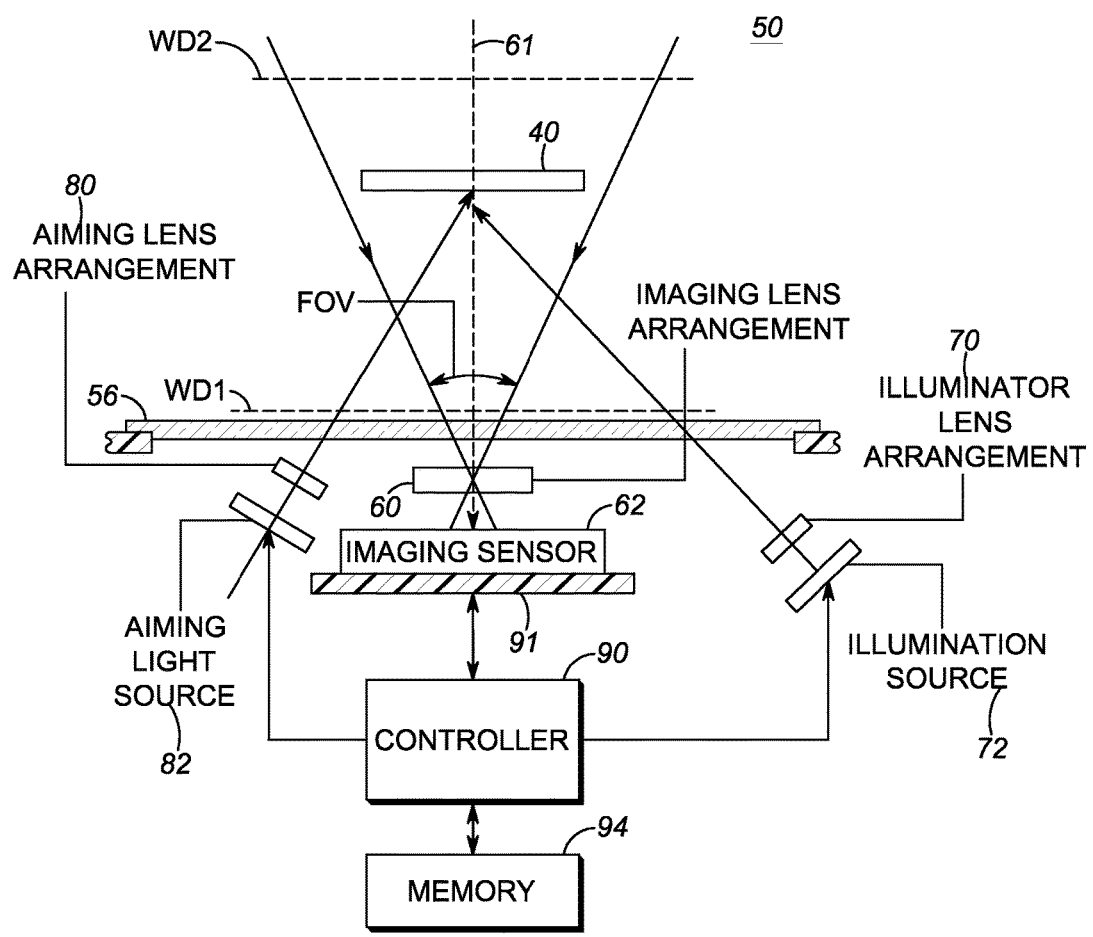
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming lens arrangement 80 positioned in front of an aiming light source 82; and (4) a controller 90. In FIG. 2, the imaging lens arrangement 60, the illuminating lens arrangement 70, and the aiming lens arrangement 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens arrangement 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Typical barcode imaging engines require a series of image frames to be captured in order to set the proper exposure and illumination power. The process begins by capturing an initial image. This image is evaluated and the exposure time or the amount of illumination is adjusted and a second image is captured. The second image is evaluated and the exposure time or illumination is adjusted again before another image is captured. This process is repeated until an acceptable image is captured. The process can require many frames and can severely impact the amount of time it takes to obtain a successful barcode decode.

Image sensors are available in two broad varieties: global shutter and rolling shutter. In a global shutter sensor, all rows of the image array are exposed at the same time. This most closely mimics a mechanical shutter type system and is typically the preferred type of sensor, but this functionality comes with a high cost.

In a rolling shutter sensor, the image rows are not exposed at the same time. A rolling shutter sensor captures an image by starting to expose the first image row, then a short time later it starts to expose the second image row, then a short time later it starts to expose the third image row, etc. Although the time of exposure of the first row will overlap with the time of exposure of several subsequent rows, the exposure of the first row will end before some rows have even begun their time of exposure. In this way, capturing an image with a rolling shutter sensor is more like capturing a series of images that are overlapping in time. Although this method of image capture can lead to distortions in fast moving images, rolling shutter sensors are still used because of the their size and cost advantages over global shutter sensors.

The present disclosure utilizes a barcode imaging engine with an illumination system that can vary its output power while an image is being acquired. The present disclosure takes advantage of the rolling shutter's staggered exposure operation to provide a method of quickly finding the proper exposure and illumination power settings to successfully decode a barcode image.

In rolling shutter mode, each given row of photosensitive elements is associated with a corresponding row exposure time period during which the amount of light impinging upon on each photosensitive element in the given row is converted into electrical signal. In rolling shutter mode, the frame exposure time covers the row exposure time periods for all rows in the imaging sensor.

At the beginning of a scanning session, when new exposure and illumination power settings need to be determined, the sensor is configured with a predetermined exposure time and the image sensor is commanded to acquire an image. The sensor begins to expose rows of the image in a staggered fashion. For example, if a 1 millisecond exposure time is chosen, then the first row of the image is exposed for 1 millisecond. A short time after exposure of the first row begins, the second row is exposed for 1 millisecond; a short time after exposure of the second row begins, the third row is exposed and so on.

Figure 3:
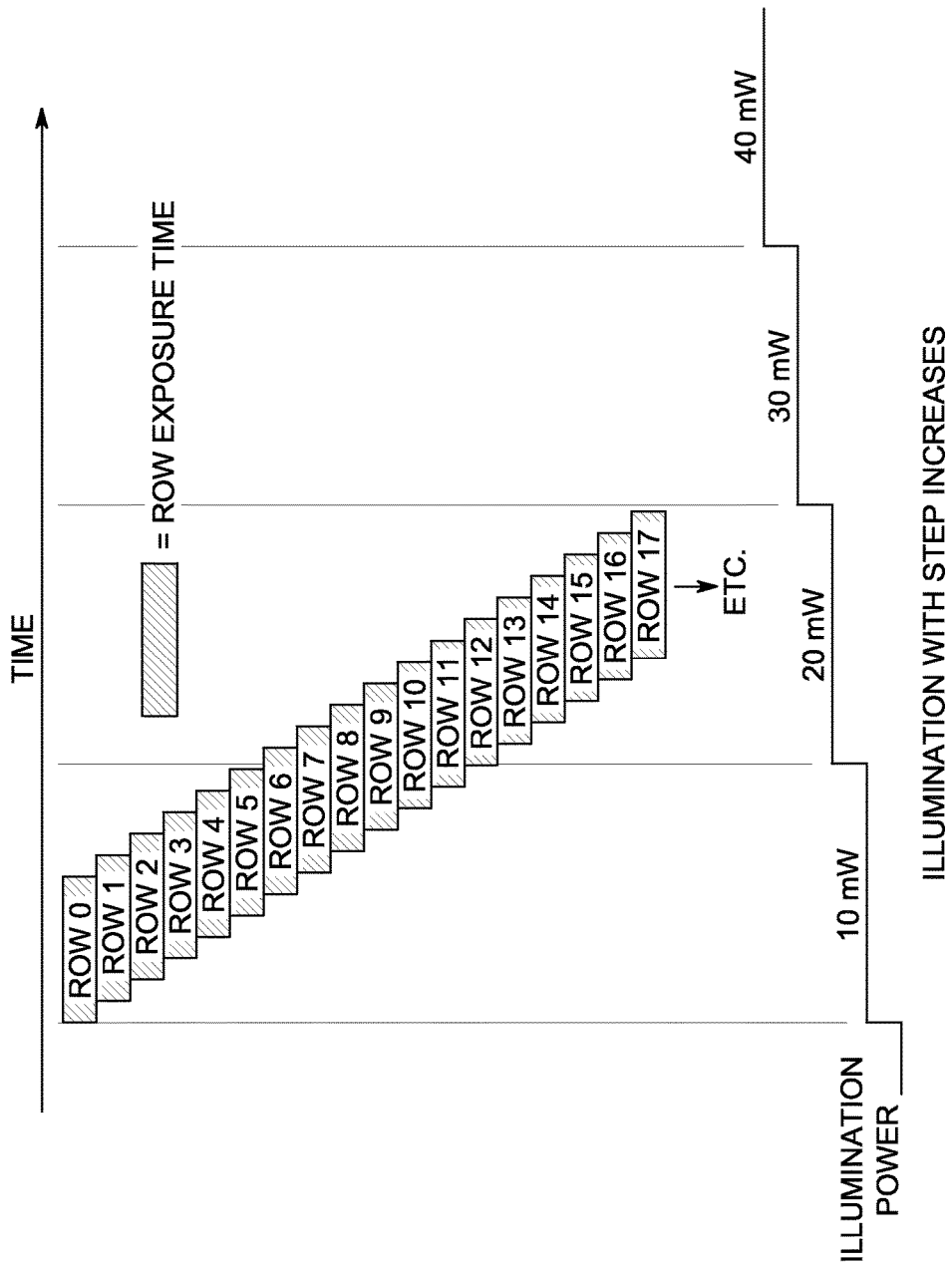
FIG. 3. shows the illumination power that increases with discrete steps in accordance with some embodiments.

In the example as shown in FIG. 3, the output power of the illumination system begins at 10 mW and then is periodically increased by a step amount until all rows of the image sensor have been exposed. Rows 0 to 5 are exposed while the illumination power is at 10 mW, rows 12 to 17 are exposed while the illumination power is at 20 mW, etc. Because each group of rows is exposed with an increasing illumination power setting, the final image will have a series of bands with increasing brightness. This single image can then be evaluated by software or custom hardware to determine the optimal exposure and illumination settings for the next image that is acquired. Thus, instead of capturing an image, adjusting settings, capturing another image and adjusting again, etc., the final exposure and illumination power settings can be found after acquiring only one image.

Figure 4:
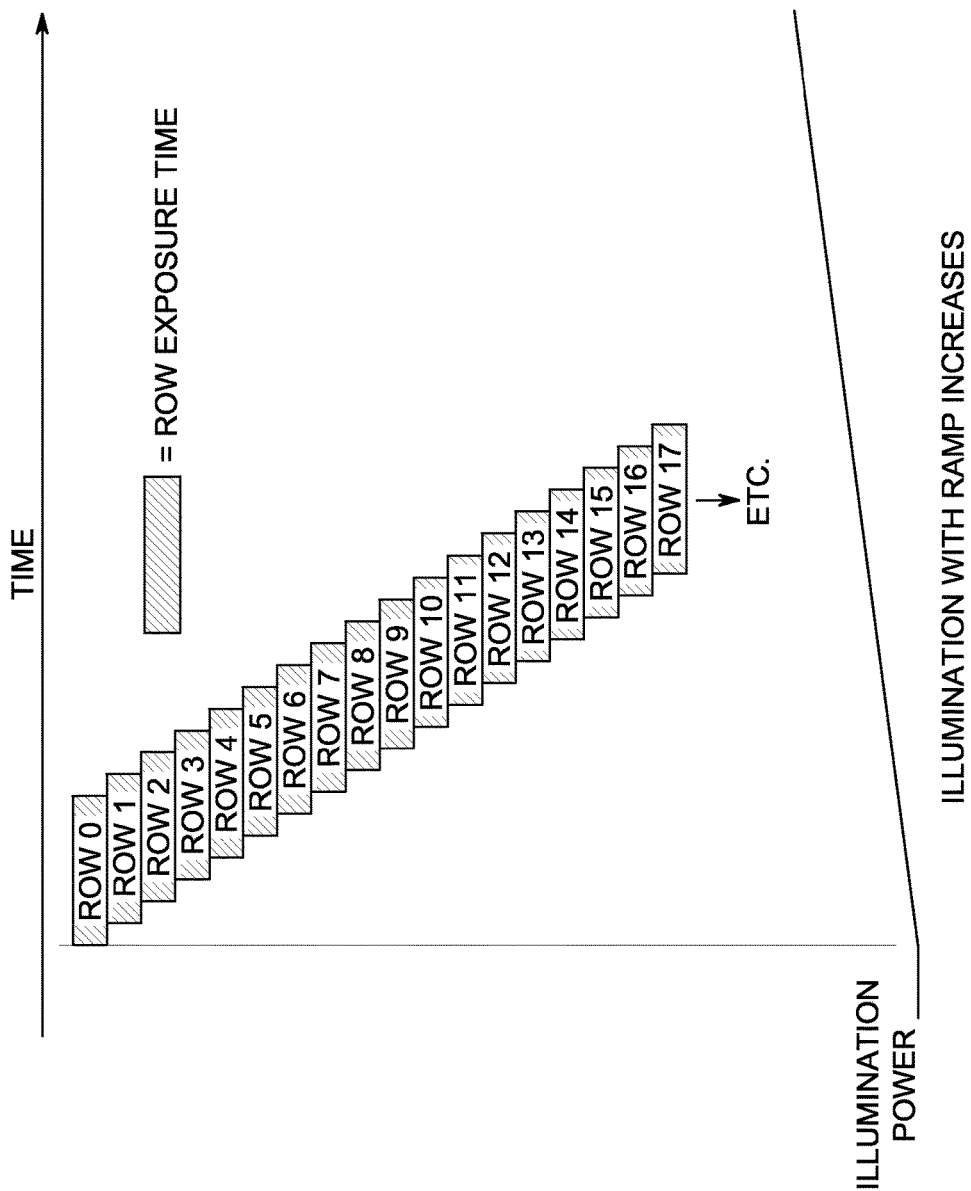
FIG. 4. shows the illumination power that increases with ramp in accordance with some embodiments.

Instead of using discrete steps in setting the illumination power, in the implementation as shown in FIG. 4, a linear ramp could also be used. This would produce an image that linearly increased in brightness from the first row to the last. Such an image could still be easily evaluated by hardware or software to determine the optimal exposure and illumination power settings.

Figure 5:
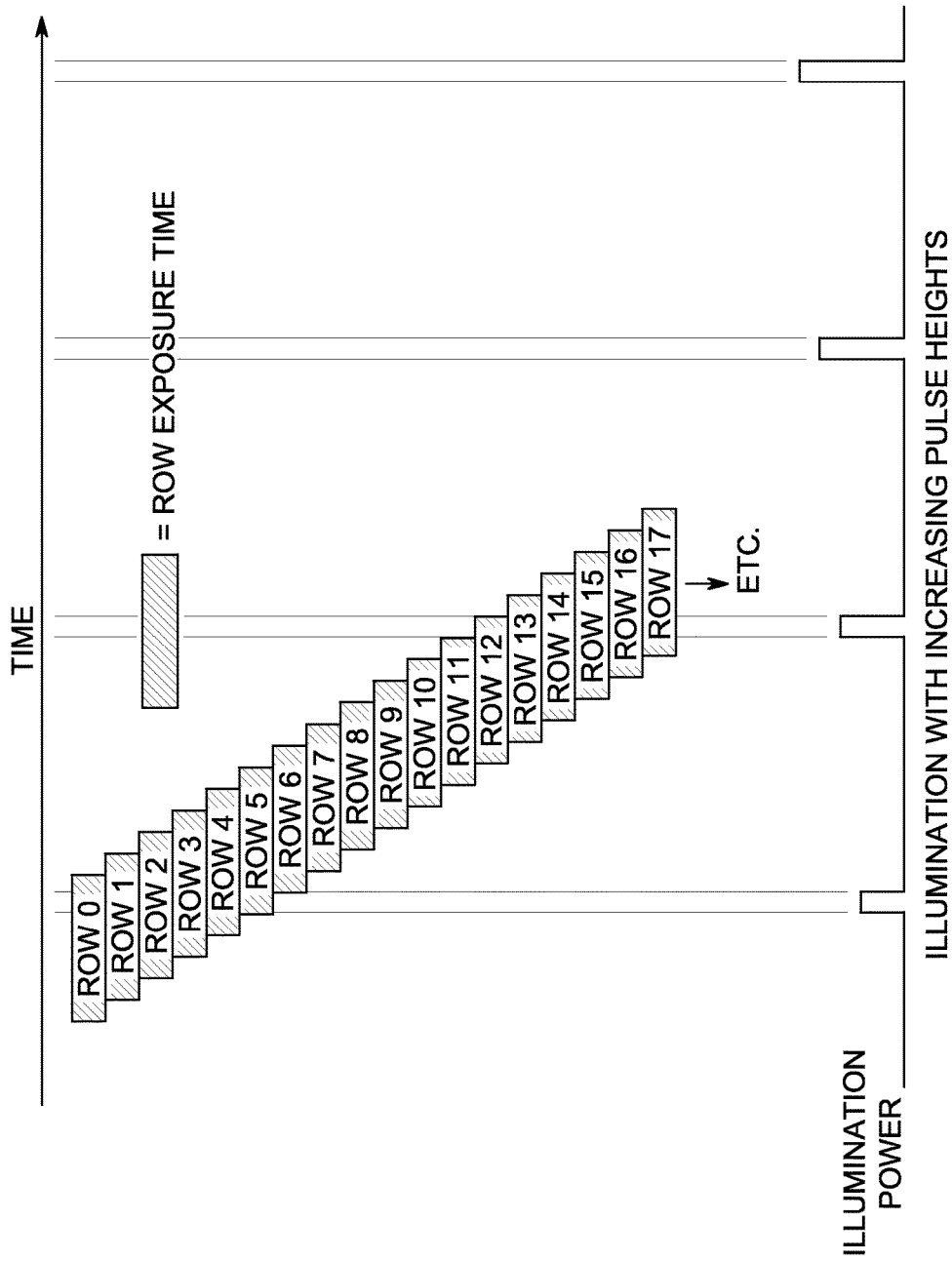
FIG. 5. shows the illumination power that increases with increasing pulse heights in accordance with some embodiments.
Figure 6:
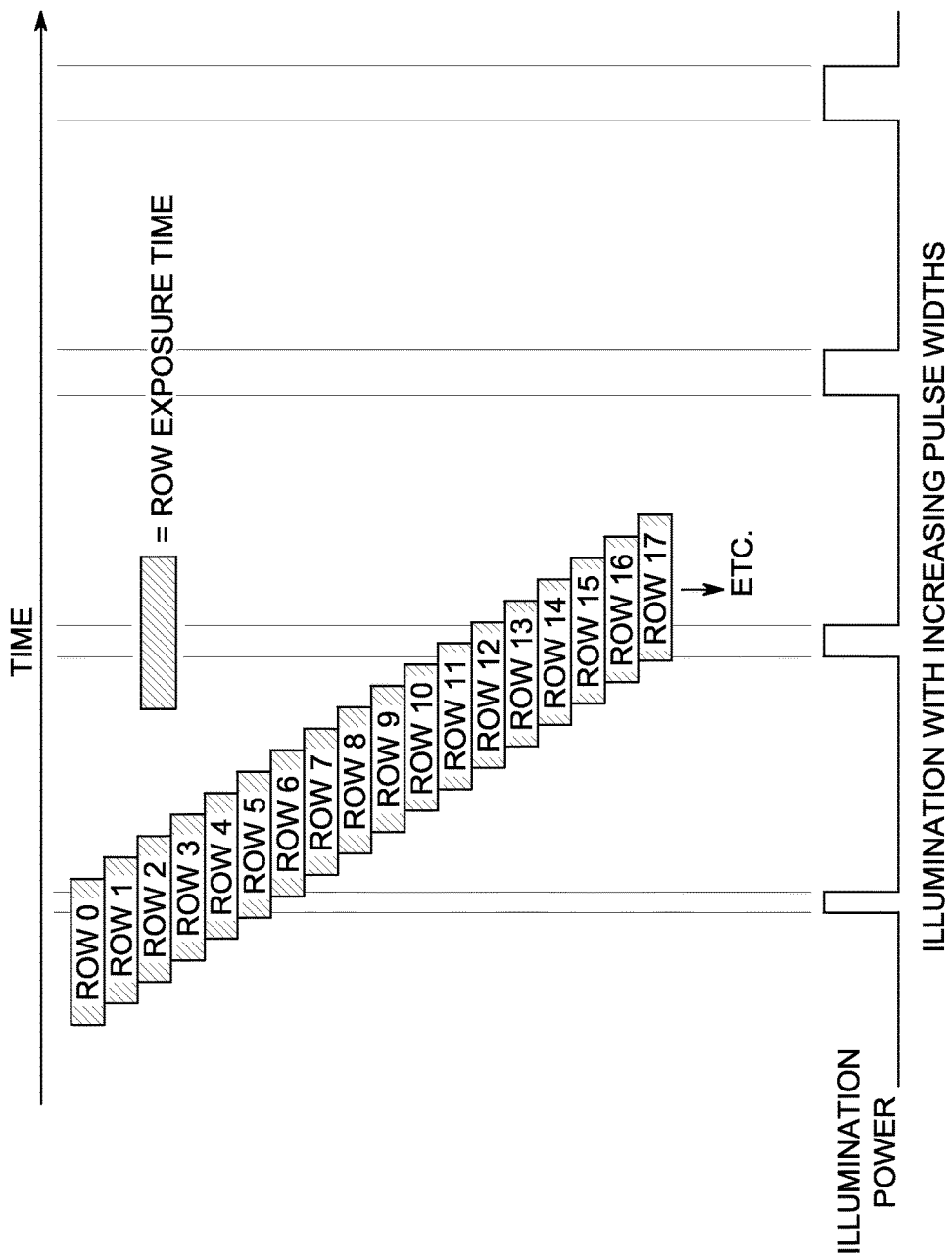
FIG. 6. shows the illumination power that increases with increasing width in accordance with some embodiments.

In another implementation as shown in FIG. 5 and FIG. 6, a series of pulses can be generated to vary the illumination output. In FIG. 5, the first illumination pulse occurs while rows 0 to 5 are being exposed, the second illumination pulse occurs while rows 12 to 17 are being exposed, etc. Since the sensor integrates the light that is returned to it, it doesn't matter if the light is a constant value as in the first example or a high narrow pulse as shown here. The pulses are increasing in magnitude; so once again, bands of increasing illumination intensity will be captured in a single final image. In the implementation as shown in FIG. 6, a series of illumination pulses is produced with a constant magnitude but increasing pulse width. As before, this will result in a single final image with bands of increasing illumination intensity.

In still implementations, the illumination pulse can be modulated with a high frequency signal that is increasing in frequency. In this scenario, fewer illumination pulses would occur during the exposure time of the lower numbered image rows and more illumination pulses would occur during the exposure time of the higher numbered image rows. Once again, a single image of increasing illumination intensity will be produced.

Figure 7:
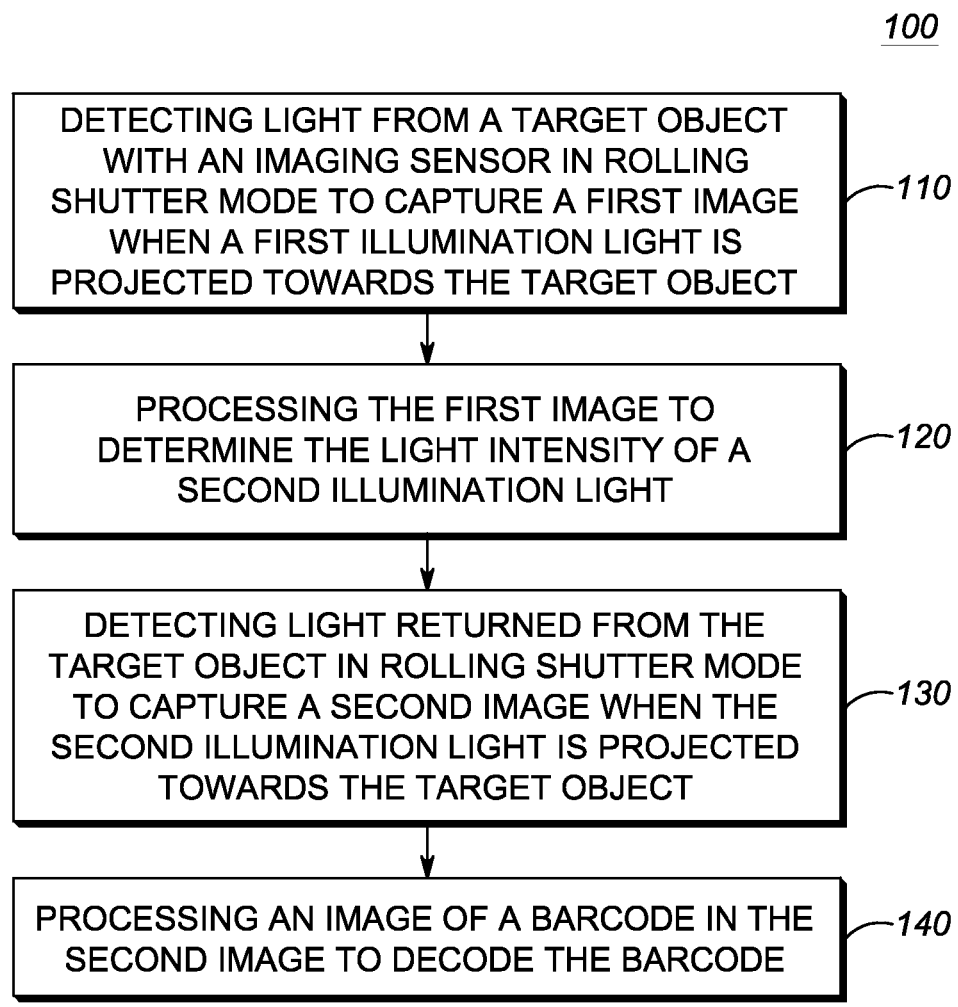
FIG. 7 is a flowchart of a method for finding the proper exposure and illumination power settings to successfully decode a barcode image in accordance with some embodiments.

FIG. 7 is a flowchart of a method 100 for finding the proper exposure and illumination power settings to successfully decode a barcode image in accordance with some embodiments. The method 100 includes block 110, block 120, block 130, and block 140.

At block 110, a first illumination light is projected towards the target object; light returned from a target object, after passing through an imaging lens arrangement 60, is detected with an imaging sensor 62 during a first frame exposure time period in rolling shutter mode to capture a first image. The imaging sensor has rows of photosensitive elements arranged in a matrix in which each row of photosensitive elements is associated with a corresponding row-exposure-time period.

At block 110, the light intensity of the first illumination light changes with time at least during part of the first frame exposure time period. For example, the light intensity of the first illumination light can be increased with multiple steps, increased with ramp, increased with increasing pulse heights, or increased with increasing pulse width. In addition, the average light intensity of the first illumination light during a first row-exposure-time periods associated with a first selected row is different from the average light intensity of the first illumination light during a second row-exposure-time period associated with a second selected row. In the examples as shown in FIG. 3, FIG. 5, and FIG. 6, the average light intensity of the first illumination light during the row-exposure-time period for any one of rows 0-5 is different from the average light intensity of the first illumination light during the row-exposure-time period for any one of rows 12-17 or any one of rows 6-11. Additionally, in the examples as shown in FIG. 3, the average light intensity of the first illumination light during the row-exposure-time period for any one of rows 0-5 is also different from the average light intensity of the first illumination light during the row-exposure-time period for any one of rows 6-11. In another example as shown in FIG. 4, the average light intensity of the first illumination light during the row-exposure-time period for any row selected from rows 0-17 is different from the average light intensity of the first illumination light during the row-exposure-time period for any other row selected from rows 0-17.

In the example of FIG. 4, each one of rows 0-17 is associated with a corresponding row-exposure-time period, and for each of these rows, the average light intensity during its corresponding row-exposure-time period is different. In the example of FIG. 3, average light intensity during the row-exposure-time period is differentiated among each one of rows 5-12. In other examples, average intensity during the row-exposure-time period is differentiated for each one of multiple selected rows, and the number of the multiple selected rows can be more than eighteen, more than four, more than eight, or more than sixteen.

In the method 100 as shown in FIG. 7, after the first image is capture at block 110, the method proceeds to block 120, block 130, and block 140. At block 120, the first image is processed to determine the light intensity of a second illumination light. At block 130, the second illumination light is projected towards the target object; light returned from the target object, after passing through the imaging lens arrangement 60, is detected with the imaging sensor 62 during a second frame exposure time period in rolling shutter mode to capture a second image. At block 140, an image of a barcode in the second image is processed to decode the barcode.

During the step of processing of the first image at block 120 to determine the light intensity of the second illumination light, at least a first part of the first image is compared with a second part of the first image. Previously at block 120, when the second illumination light is projected towards the target object at block 110, the average light intensity of the first illumination light during the first row-exposure-time periods associated with the first selected row is different from the average light intensity of the first illumination light during the second row-exposure-time period associated with the second selected row. At block 120, the first part of the first image includes pixels captured with photosensitive elements at least in the first selected row, and the second part of the first image includes pixels captured with photosensitive elements at least in the second selected row. For the examples as shown in FIG. 3, FIG. 5, and FIG. 6, the first selected row and the second selected row can be respectively row 0 and row 12 in accordance with some embodiments. In some implementations, the first part of the first image including pixels in rows 0-5 is compared with the second part of the first image including pixels in rows 12-17 to determine the light intensity of the second illumination light. In other implementations, the first part of the first image including pixels in rows 0-1 is compared with the second part of the first image including pixels in rows 12-16 to determine the light intensity of the second illumination light.

In many implementations, more than two parts of the first image are compared to determine the light intensity of the second illumination light. In some implementations, multiple parts of the first image are compared to determine the light intensity of the second illumination light, and each of the multiple parts include pixels at least in one of the selected rows; in addition, the average light intensity of the first illumination light during the row-exposure-time period associated with any one of the selected rows is different from that during the row-exposure-time period associated with any other of the selected rows. In one example as shown in FIG. 3, the selected rows can be row 0, row 6, and row 12 in accordance with some embodiments. In one implementation, the first part of the first image including pixels in rows 0-5, the second part of the first image including pixels in rows 12-17, and the third part of the first image including pixels in rows 6-11; all these three parts of the first image can be compared to determine the light intensity of the second illumination light.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    detecting light returned from a target object through an imaging lens arrangement with an imaging sensor during a first frame exposure time period to capture a first image when a first illumination light is projected towards the target object, the imaging sensor having rows of photosensitive elements arranged in a matrix wherein each row of photosensitive elements is associated with a corresponding row-exposure-time period;
    wherein the average light intensity of the first illumination light during a first row-exposure-time periods associated with a first selected row is different from the average light intensity of the first illumination light during a second row-exposure-time period associated with a second selected row;
    detecting light returned from the target object through the imaging lens arrangement with the imaging sensor during a second frame exposure time period to capture a second image when a second illumination light is projected towards the target object, wherein the light intensity of the second illumination light is determined from processing the first image; and processing an image of a barcode in the second image to decode the barcode.

2. The method of claim 1, further comprising:

comparing a first part of the first image with a second part of the first image to determine the light intensity of the second illumination light during at least part of the second frame exposure time period.

3. The method of claim 2, the first part of the first image includes pixels captured with photosensitive elements at least in the first selected row, and the second part of the first image includes pixels captured with photosensitive elements at least in the second selected row.

4. The method of claim 1, further comprising:

projecting the first illumination light towards the target object with the light intensity of the first illumination light changing with time at least during part of the first frame exposure time period, wherein the average light intensity of the first illumination light during the row-exposure-time period for any one of multiple selected rows is different from the average light intensity of the first illumination light during the row-exposure-time period for any other one of the multiple selected rows, wherein the multiple selected rows includes at least four selected rows.

5. The method of claim 1, further comprising:

controlling an illumination source to lineally increase the light intensity of the first illumination light during a time period that covers at least the first row-exposure-time period and the second row-exposure-time period.

6. The method of claim 1, further comprising:

controlling an illumination source to generate the first illumination light by creating multiple light pulses with the light intensity of each of the multiple light pulses different from each other.

7. The method of claim 6, wherein the time duration of each of the multiple light pulses is identical.

8. The method of claim 1, further comprising:

controlling an illumination source to generate the first illumination light by creating multiple light pulses with the time duration of each of the multiple light pulses different from each other.

9. The method of claim 8, wherein the light intensity of each of the multiple light pulses is identical.

10. The method of claim 1, further comprising:

controlling an illumination source to cause the light intensity of the first illumination light to increase with time in multiple steps.

11. The method of claim 10, wherein the time duration of each of the multiple steps is identical.

12. A method comprising:

detecting light returned from a target object through an imaging lens arrangement with an imaging sensor during a first frame exposure time period to capture a first image when a first illumination light is projected towards the target object, the imaging sensor having rows of photosensitive elements arranged in a matrix wherein each row of photosensitive elements is associated with a corresponding row-exposure-time period;

wherein the light intensity of the first illumination light changes with time at least during part of the first frame exposure time period, and the average light intensity of the first illumination light during a first row-exposure-time periods associated with a first selected row is different from the average light intensity of the first illumination light during a second row-exposure-time period associated with a second selected row;

processing the first image to determine the light intensity of a second illumination light, wherein said processing the first image comprises comparing a first part of the first image with a second part of the first image, and wherein the first part of the first image includes pixels captured with photosensitive elements at least in the first selected row, and the second part of the first image includes pixels captured with photosensitive elements at least in the second selected row; and detecting light returned from the target object through the imaging lens arrangement with the imaging sensor during a second frame exposure time period to capture a second image when the second illumination light is projected towards the target object; and processing an image of a barcode in the second image to decode the barcode.

13. An apparatus comprising:

an imaging sensor having rows of photosensitive elements arranged in a matrix, the imaging sensor being configured to capture an image from a target object during a frame exposure time period wherein each row of photosensitive elements is associated with a corresponding row exposure time period;

an imaging lens arrangement configured to operate together with the imaging sensor for detecting light from the target object within a field of view;

an illumination source operative for generating an illumination light projected towards the target object a controller operative to cause the illumination source to generate a first illumination light during a first frame exposure time period when a first image is captured and to generate a second illumination light during a second frame exposure time period when a second image is captured in rolling shutter mode, wherein the light intensity of the first illumination light changes with time at least during part of the first frame exposure time period, and wherein the average light intensity of the first illumination light during a first row-exposure-time periods associated with a first selected row is different from the average light intensity of the first illumination light during a second row-exposure-time period associated with a second selected row; and wherein the controller is further operative to determine the light intensity of the second illumination light from processing the first image including comparing a first part of the first image with a second part of the first image, and wherein the first part of the first image includes pixels captured with photosensitive elements in the first selected row, and the second part of the first image includes pixels captured with photosensitive elements in the second selected row.

14. The apparatus of claim 13, wherein the light intensity of the first illumination light lineally increases with time.

15. The apparatus of claim 13, wherein the first illumination light comprises multiple light pulses with the light intensity of each of the multiple light pulses different from each other.

16. The apparatus of claim 15, wherein the time duration of each of the multiple light pulses is identical.

17. The apparatus of claim 13, wherein the first illumination light comprises multiple light pulses with the time duration of each of the multiple light pulses different from each other.

18. The apparatus of claim 17, wherein the light intensity of each of the multiple light pulses is identical.

19. The apparatus of claim 13, wherein the light intensity of the first illumination light lineally increases with time in multiple steps.

20. The apparatus of claim 13, wherein the time duration of each of the multiple steps is identical;
   a third transistor having a semiconductor channel with a terminal as the second output of the first current mirror device and having a gate connected to the gate of the first transistor; and
   a storage capacitive element connecting to the gate of the second transistor.

\* \* \* \* \*